(12) United States Patent
Lundberg

(10) Patent No.: US 6,510,700 B1
(45) Date of Patent: Jan. 28, 2003

(54) ELECTRICAL EXPANSION VALVE

(75) Inventor: Erik Lundberg, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/932,740

(22) Filed: Aug. 17, 2001

(51) Int. Cl.⁷ .............................. F25B 41/04
(52) U.S. Cl. .................. 62/222; 62/223; 138/45
(58) Field of Search ........... 62/222, 223, 224, 62/202; 137/341; 251/11; 138/45, 33

(56) References Cited

U.S. PATENT DOCUMENTS

| | | |
|---|---|---|
| 3,691,783 A | 9/1972 | Proctor |
| 4,879,879 A | 11/1989 | Marsala et al. |
| 5,052,190 A | 10/1991 | Gregory |
| 5,127,237 A | 7/1992 | Sendo et al. |
| 5,195,331 A * | 3/1993 | Zimmeran ................... 62/202 |
| 5,303,864 A | 4/1994 | Hirota |
| 5,361,597 A | 11/1994 | Hazime et al. |
| 5,546,757 A | 8/1996 | Whipple |
| 5,943,871 A | 8/1999 | Ito et al. |
| 5,957,376 A | 9/1999 | Fujimoto et al. |
| 5,966,960 A * | 10/1999 | Cummings et al. ............ 138/44 |
| 6,012,299 A | 1/2000 | Schmidt et al. |
| 6,357,721 B1 * | 3/2002 | Maurer ................... 251/129.15 |

* cited by examiner

Primary Examiner—Denise L. Esquivel
Assistant Examiner—Mohammad M. Ali
(74) Attorney, Agent, or Firm—Brinks Hofer Gilson & Lione

(57) ABSTRACT

An expansion valve for modifying the flow of a refrigerant fluid to provide reliable control of a refrigeration system includes a channel for conveying the refrigerant fluid. The channel has an inlet for accepting the refrigerant fluid and an outlet for exhausting the refrigerant fluid. A heating element is disposed in a path of the fluid and associated with the inlet. Electrical terminals are coupled to the heating element for controlling thermal properties of the heating element to modulate or regulate the flow of the refrigerant fluid through the channel.

30 Claims, 3 Drawing Sheets

ELECTRICAL EXPANSION VALVE

FIELD OF THE INVENTION

This invention relates to an electrical expansion valve, such as that used in a refrigeration system or an air-conditioning system.

BACKGROUND

In the prior art, refrigeration systems have used thermostatic expansion valves as an interface between a high pressure side and a low pressure side of a refrigeration system. A thermostatic expansion valve regulates the rate at which refrigerant enters into the evaporator or cooling coil based upon the amount of heat to be removed from a refrigerated space. In a typical configuration, a thermostatic expansion valve includes a valve, a valve-opening mechanism, and a spring that opposes opening of the valve by the valve-opening mechanism to control the flow of refrigerant through the opening of the valve. The valve-opening mechanism may refer to a diaphragm which is moved by a temperature sensor. The temperature sensor may include a gas charged bulb coupled to a capillary tube. The temperature sensor may be associated with an output of the evaporator. When working properly, the thermostatic expansion valve senses the pressure of the refrigerant coming into the evaporator and the temperature of the refrigerant as it leaves the evaporator to meter the proper flow of the refrigerant into the evaporator.

However, the thermostatic valve may not operate with sufficient reliability and may be too expensive for certain applications for the following reasons. The thermostatic expansion valve may require numerous mechanical parts, including the diaphragm, the spring, the valve, the housing, the temperature sensor, which need to be manufactured according to strict tolerances and assembled carefully to create a reliable thermostatic expansion valve. During operation, the thermostatic expansion valve may experience failure or operational problems caused by one or more of the following: dirt or debris that accumulates in the opening associated with the valve, mechanical or thermal stress on the spring that lowers the spring force from its original value, corrosion of the interior of the thermostatic expansion valve which prevents the proper movement of the valve, mechanical problems that impede the movement of the diaphragm, or other problems. Thus, a need exists for an expansion valve that is economical to manufacture, while providing reliable control of the rate which refrigerant enters the evaporator.

Thermostatic expansion valves may also perform more slowly than desired because of the technical design that relies upon the movement of the diaphragm or another mechanical member in response to air or gas pressure changes. For example, a temperature sensor may be configured as a gas-charged bulb that interacts with the diaphragm through a capillary tube to control the metering of the refrigerant. Thus, a need exists for an expansion valve that provides accurate and rapid control of the refrigerant expansion process in a refrigeration or air conditioning system.

SUMMARY

In accordance with the invention, an expansion valve for regulating the flow of a refrigerant fluid to provide reliable control of a refrigeration system includes a channel for conveying the refrigerant fluid. The channel has an inlet for accepting the refrigerant fluid and an outlet for exhausting the refrigerant fluid. A heating element is disposed in a path of the fluid and associated with the inlet. Electrical terminals are coupled to the heating element for controlling thermal properties of the heating element to regulate the flow of the refrigerant fluid through the channel.

DETAILED DESCRIPTION OF THE INVENTION

Figure 1:
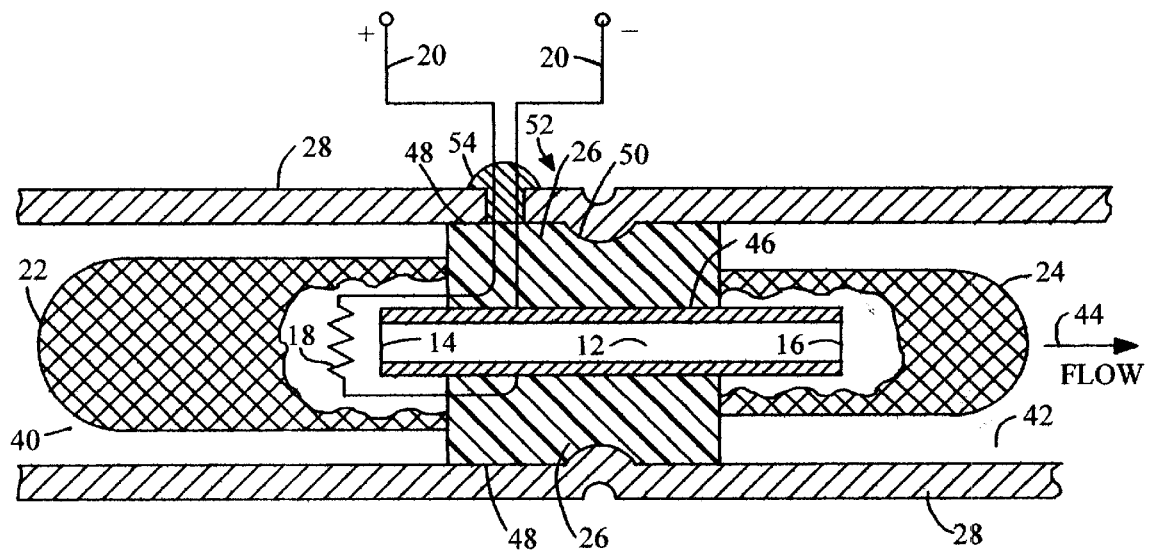
FIG. 1 is a cross-sectional diagram of an expansion valve in accordance with the invention.

In accordance with the invention, an expansion valve 10 regulates the flow of a refrigerant fluid in a refrigeration system or an air conditioning system. The expansion valve 10 comprises a channel 12, a heating element 18 associated with the channel 12, and electrical terminals 20 of the heating element 18. The channel 12 conveys the refrigerant fluid in a regulated manner from the inlet 14 to the outlet 16. The inlet 14 accepts the fluid and the outlet 16 exhausts the fluid. The heating element 18 is disposed in the path of the refrigerant fluid and is associated with the inlet 14. Electrical terminals 20 are coupled to the heating element 18 for controlling the thermal properties of the heating element 18 to regulate the flow of the refrigerant fluid through the channel 12.

As shown in FIG. 1, the refrigerant fluid generally flows, if at all, from the high-pressure fluid side 40 at the left-hand side of the drawing to the low pressure fluid side 42 at the right-hand side of the drawing, as indicated by the arrow 44. In one embodiment, the channel 12 comprises a generally tubular member. For example, the channel 12 may comprise a generally cylindrical member or tubular member composed of brass, aluminum, stainless steel, a metal alloy, or a metal that is compatible with the refrigerant fluid or coated with a corrosion-resistant lining.

An inlet screen 22 generally encapsulates the inlet 14 of the channel 12. Similarly, an outlet screen 24 encapsulates the outlet 16 of the channel 12. An inlet screen 22 may be constructed of stainless steel mesh, for example. Although the expansion valve 10 of FIG. 1 includes the inlet screen 22 and the outlet screen 24, in alternative embodiments the inlet screen 22 and the outlet screen 24 may be omitted.

The heating element 18 is associated with the inlet 14 of the channel 12. The heating element 18 may be disposed at a mouth or near a mouth of the inlet 14 of the channel 12. In one embodiment, the heating element 18 comprises a resistive heating element 18. For example, the heating element 18 may comprise a inductive coil, a wire-round resistor, a ceramic heating element or another electrical heating element. The heating element 18 includes at least one terminal for applying an electrical energy source to the heating element 18. For example, the heating element 18 may include two terminals as shown in FIG. 1 for applying a direct voltage (DC) to the heating element 18.

In an alternate embodiment, the heating element 18 may be positioned within the channel 12 rather than at or near the inlet 14 of the channel 12.

The channel 12 may be mounted within a pipe 28 or another conduit for refrigerant fluid. The channel 12 is secured to the pipe 28 via a housing 26. In one embodiment, the pipe 28 comprises aluminum tubing or some other tubing (e.g., metallic tubing) that is generally compatible with the refrigerant fluid or treated with a corrosion-resistant lining to resist attack from the refrigerant fluid.

The housing 26 may be shaped like a generally hollow cylinder. In one embodiment, the housing 26 may be composed of one or more of the following: a polymer, a plastic, a composite, and an elastomer. An interior of the housing 26 has a recess 46 for receiving the channel 12. The exterior 48 of the housing 26 may be commensurate in size and shape to the interior dimensions of the pipe 28. Further, the exterior 48 may have an indention 50 or another provision for securing the housing 26 to the pipe 28. Although the indentation secures to the housing 26 to the pipe 28 in an interlocking manner, consistent with a crimp 52, other fastening techniques may be used to secure the housing 26, and hence, the electrical expansion valve 10 to the pipe 28. For example, the plastic housing 26 may be connected to the pipe 28 by a press fit, an adhesive, a mechanical fastener, interlocking geometry or the like.

The electrical terminals 20 of the resistive heating element 18 may be introduced to the electrical expansion valve 10 via a potting compound or another suitable dielectric material 54. In one embodiment, the pipe 28 is composed of aluminum tubing, metallic tubing, metallic alloy tubing or similar tubing that requires electrical isolation from the terminals by the potting compound or dielectric material 54.

The expansion valve 10 generally has a maximum flow area determined by a cross-sectional area of channel 14 (e.g., the inlet 14 of the channel 12). The heating element 18 is used to control the effective flow area of the channel 12 within a range between the maximum flow area and a minimum flow area (e.g., approximately twenty percent of the maximum flow area). The effective area and the corresponding flow rate through the channel is controlled by the extent of heating or not heating the liquid refrigerant at the inlet 14 of the channel 12. The maximum flow rate occurs when the heating element 18 is inactive or applies no additional heat to the refrigerant. The minimum flow rate occurs when the heating element 18 generates the maximum amount of heat at or near the inlet 14. The maximum flow rate and the minimum flow rate may depend upon one or more of the following factors: the type of refrigerant fluid used, the electrical energy applied to the heating element 18, the geometry and dimensions of the channel 12, and the positioning of the heating element 18 in the fluid path.

A refrigerant may be a nonflammable fluidic composition of flourine, carbon, and chlorine that has a relatively low-boiling point that is lower than the desired temperature of the refrigerated space. The refrigerant fluid may comprise Freon, R12 Freon, R134a refrigerant, ammonia, ethyl-chloride, Freon, commercially-available refrigerants, or other refrigerants. Freon is a trademark of E. I. Dupont De Nemours and Company Corporation, 1007 Market St., Wilmington, Delaware 19898.

In general, the heat applied from the heating element 18 may disrupt the flow of refrigerant fluid through the channel 12 to reduce the effective flow area of the channel 12. The application of heat produces small pockets of vapor or bubbles near the inlet 14 of the channel 12 which disrupts the flow of the fluid. Because the heating element 18 has a very small thermal mass compared to the flowing refrigerant fluid, the heating element 18 can heat up or cool down very rapidly to produce very rapid control of the refrigerant expansion process in the air conditioning or refrigeration system.

When electrical energy is applied to the heating element 18, the liquid refrigerant may boil or vaporize at the interface of the heating element 18 and the refrigerant fluid in a liquid phase. The boiling causes the liquid phase to be converted into a mixture of a liquid phase and vapor phase of the refrigerant. The presence of the vapor phase in the channel 12 has an effect on the pressure drop in the region surrounding the heating element 18 at the inlet 14. A relatively minor pressure drop at the inlet 14 may have a major effect on the overall pressure drop of the entire channel 12. The pressure drop of the entire channel 12 may depend upon the length of the channel 12 and the cross-sectional area of the channel 12 as well as the amount of heat applied by the heating element 18. The increase in the pressure drop at the beginning of the channel 12 causes the liquid refrigerant to flash or boil earlier in its flow through the channel 12 than it ordinarily would. The earlier flashing or boiling causes a large reduction in the pressure drop through the channel 12 and therefore, decreased flow of the refrigerant through the channel 12. That is, the pressure differential between an inlet 14 of the tube and an outlet 16 of the tube or channel 12 is reduced by application of heat from the heating element 18 to the refrigerant fluid.

The cross-sectional area of the channel 12 is sized so that the flow rate of the refrigerant fluid through the channel 12 with no electrical energy supplied to the heating element 18 is equal to, greater than or commensurate with the maximum flow rate that the air conditioning system or refrigeration system (which incorporates the electrical expansion valve 10) requires under the highest load condition. Lower load conditions than the highest load condition require some amount of electrical energy to be applied to the heating element 18 to control or reduce the flow to the desired rate. The amount of electrical energy that is applied to the heating element 18 is generally insignificant in comparison to the efficiency or capacity of the refrigeration system.

Figure 2:
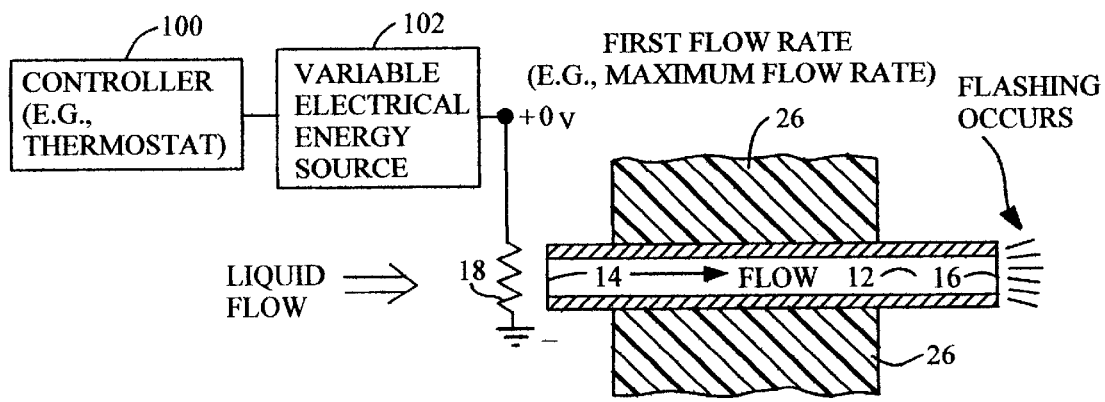
FIG. 2 is a cross-sectional diagram of a portion of an expansion valve operating at a first flow rate (e.g., a maximum flow rate) in accordance with the invention.
Figure 3:
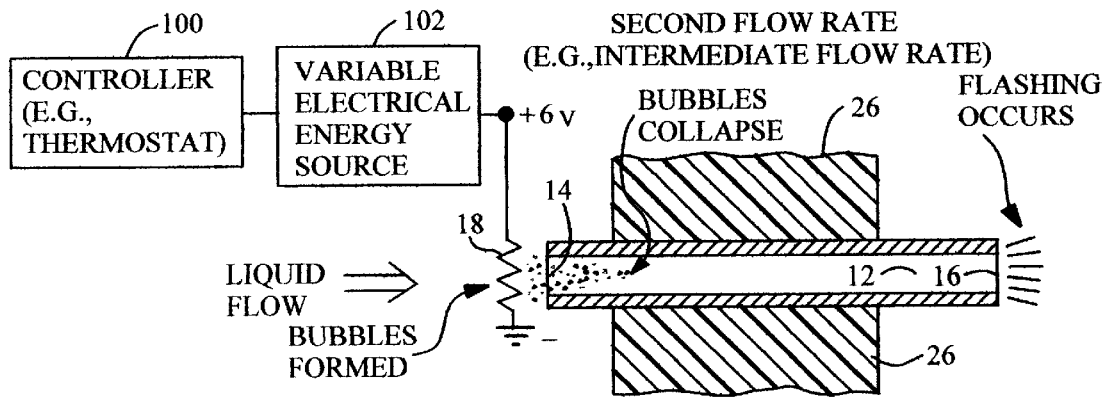
FIG. 3 is a cross-sectional diagram of a portion of an expansion valve operating at a second flow rate (e.g., an intermediate flow rate) in accordance with the invention.
Figure 4:
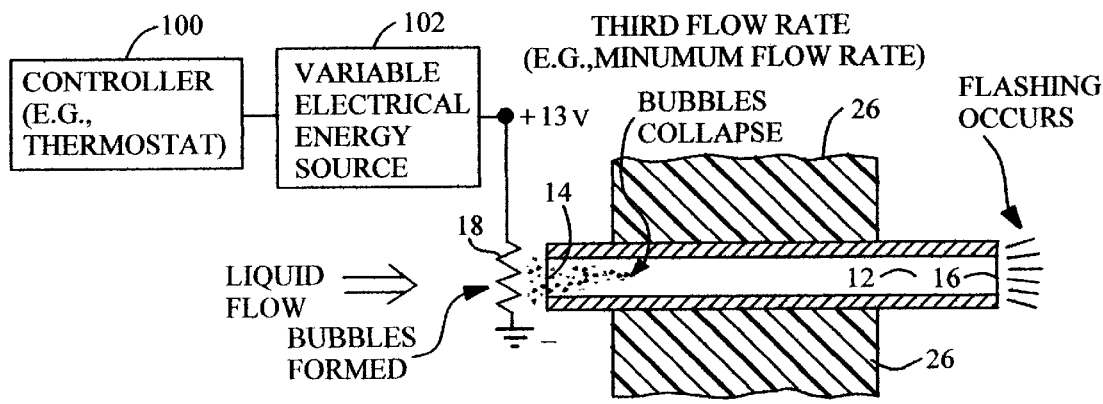
FIG. 4 is a cross-sectional diagram of a portion of the electrical expansion valve operating at a third flow rate (e.g., a minimum flow rate) in accordance with the invention.

FIG. 2 through FIG. 4 show the electrical expansion valve 10 operating at three different flow rates, designated a first flow rate in FIG. 2, a second flow rate in FIG. 3 and a third flow rate in FIG. 4. The first flow rate is higher than the second flow rate. The second flow rate is higher than the third flow rate. Like elements in FIG. 1 through FIG. 4, inclusive, indicate like elements.

In FIG. 2 through FIG. 4, a controller 100 is coupled to a variable electrical energy source 102. In turn, the variable electrical energy source 102 is coupled to at least one terminal of the heating element 18. In one embodiment, the controller 100 comprises a thermostat that senses a temperature of a climate-controlled or refrigerated spatial volume (e.g., a room or the interior of a vehicle). The controller 100 instructs the variable electrical energy source to output a particular electrical energy level within a range of possible energy levels to control the temperature of the climate-controlled or refrigerated spatial volume in accordance with user preferences or a desired plan.

FIG. 2 shows the cross-sectional view of the electrical expansion valve 10 operating at a first flow rate (e.g., a maximum flow rate) with no energy applied to the heating element 18. For example, no electrical energy or zero volts of direct current (DC) voltage may be applied to a resistive heating element 18 in FIG. 2 to produce an effective flow area of approximately one hundred percent of the cross-sectional area of the channel 12.

FIG. 3 shows a second flow rate (e.g., an intermediate flow rate) in which electrical energy greater than no electrical energy, but less than the maximum electrical energy is applied to the heating element 18 to provide an effective flow area of approximately sixty percent of the cross-sectional area of the channel 12. For example, six volts of direct current (DC) voltage may be applied to a resistive heating element 18 in FIG. 2 to produce an effective flow area of approximately sixty percent of the cross-sectional area of the channel 12.

FIG. 4 shows a third flow rate (e.g., a minimum flow rate) the electric expansion valve 10 in which the electrical energy applied to the heating element 18 is at a maximum level that maximizes the heat radiated by the heating element 18 to provide an effective flow area of approximately twenty percent of the total cross-sectional area of the channel 12. For example, 13 volts of direct current (DC) voltage may be applied to the resistive heating element 18 to provide an effective flow area of approximately twenty percent of the total cross-sectional area of the channel 12.

Figure 5:
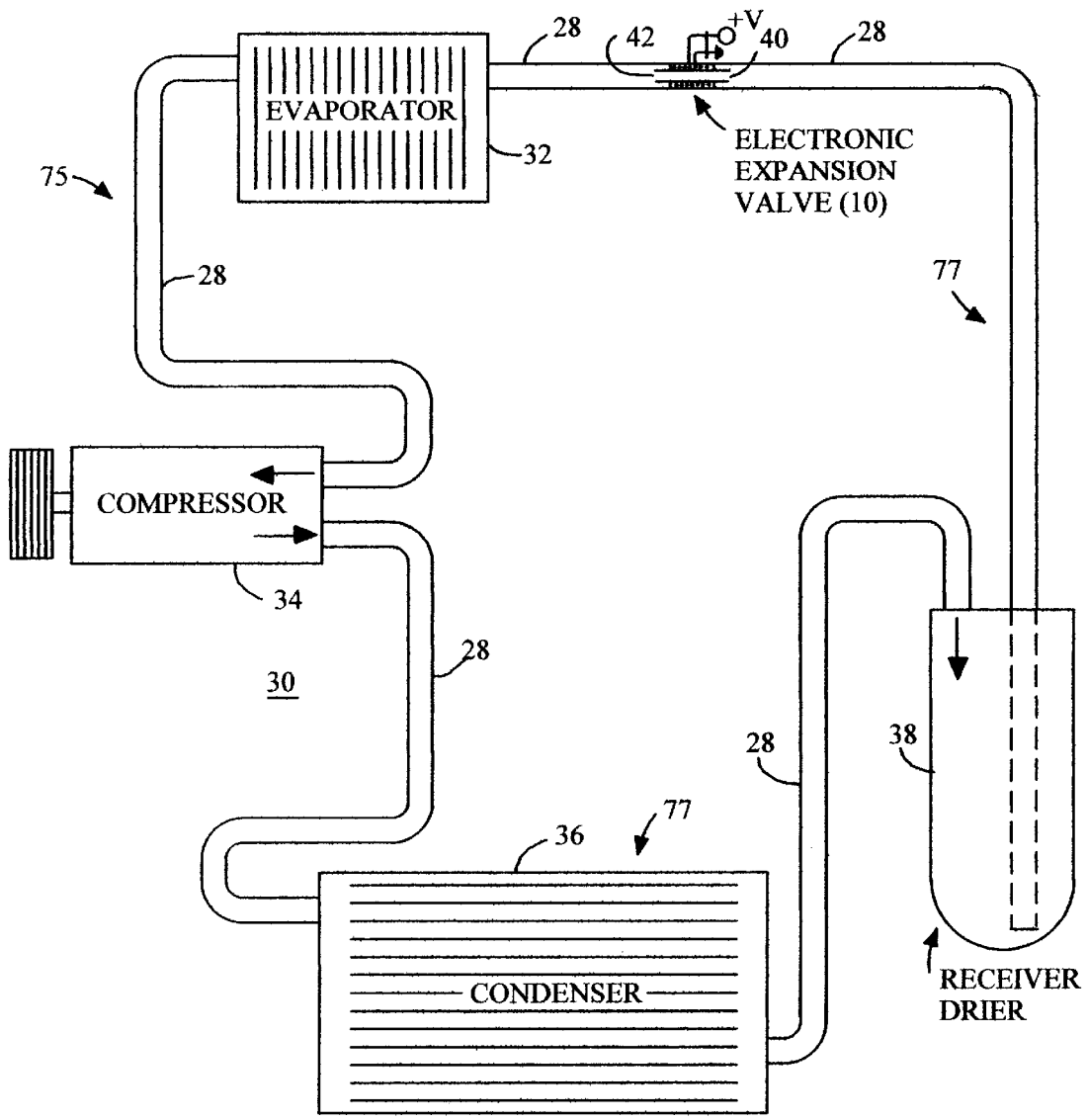
FIG. 5 is a block diagram of an electrical expansion valve integrated into a refrigeration system or an air conditioning system in accordance with the invention.

FIG. 5 shows a block diagram of a cooling, air-conditioning or refrigeration system 30, which will be referred to as a refrigeration system 30 for convenience. The refrigeration system 30 incorporates any of the embodiments or variations of the electrical expansion valves 10 previously discussed herein. Like reference numbers in FIG. 1 and FIG. 5 indicate like elements.

In FIG. 5, an evaporator 32 facilitates evaporation of the refrigerant fluid within the lower pressure region 75 of the refrigeration system 30. The compressor 34, coupled to an output of the evaporator 32, increases the pressure of the refrigerant fluid from the lower pressure region 75. A condenser 36 receives the refrigerant flow with increased pressure and condenses the refrigerant back into a liquid within a higher pressure region 77. An expansion valve 10 is coupled to the output of a condenser 36 for providing an interface between the higher pressure region 77 and a lower pressure region 75.

The compressor 34 receives the flow of fluid refrigerant from an evaporator 32. The refrigerant primarily is in a vapor phase when compressed by the compressor 34. The compressor 34 increases the pressure of the refrigerant fluid so that the refrigerant fluid in the vapor phase leaves the compressor 34 at higher pressure than when it entered.

As the fluid refrigerant flows through a condenser 36 from the compressor 34, the higher pressure causes the vapor to condense back to a liquid phase of the refrigerant fluid. During the condensation, the vapor phase radiates heat to convert to the liquid phase. The condenser 36 may be mounted to radiate heat into the outdoors when mounted on an automobile or another vehicle for example. 20. In one embodiment, the compressor 34 is driven by a belt-and-pulley assembly of an internal combustion engine of the vehicle.

A receiver dryer 38 may be coupled between the condenser 36 and the electrical expansion valve 10 of FIG. 5. The receiver dryer 38 receives condensation from the condenser 36 in the liquid phase to prevent reduction of the efficiency of the condenser 36 that may otherwise occur through the accumulation of such liquid phase of the refrigerant within the condenser 36. In an alternate embodiment, the receiver dryer 38 may be eliminated, although the efficiency of the refrigeration system 30 may decline.

The condenser 36 is coupled to an electrical expansion valve 10 via the receiver dryer 38. The electrical expansion valve 10 provides an interface between a high pressure region 77 of the condenser 36 and a low pressure region 75 of the evaporator 32. The evaporator 32 receives liquid refrigerant and changes the liquid refrigerant from a liquid phase to a vapor phase. During the transition from the liquid phase to the vapor phase, the refrigerant fluid gets colder through evaporation of the vapor within the volumetric confines of the refrigeration system 30. Evaporation occurs because of the lower pressure region 75 of the evaporator 32 is lower in pressure than the higher pressure region 77 of the condenser 36.

The expansion valve 10 comprises a channel 12 for conveying the refrigerant fluid from an inlet 14 to an outlet 16 and a heating element 18 disposed in a path of the refrigerant fluid and associated with the inlet 14. The heating element 18 controls the degree of circulation of the fluid refrigerant via localized heating of the fluid refrigerant.

The boiling point of the refrigerant liquid is a temperature at which the refrigerant liquid turns into a vapor. The boiling point of the liquid refrigerant depends upon the pressure to which the refrigerant is exposed within the refrigeration system 30 and the properties of the refrigerant. Within a lower pressure region 75, the boiling point of the refrigerant may be reduced in temperature. Similarly, the refrigerant in the vapor phase may be converted to the liquid phase or condensed by increasing the pressure as in the high pressure region 77 of the refrigeration system 30. During the transition from a liquid phase to a vapor phase, the refrigerant absorbs heat. In contrast, during the transition from a vapor phase to a liquid phase of the refrigerant, the refrigerant radiates heat.

Although the degree of refrigeration may be controlled by turning on and off the compressor 34 or controlling the duty cycle of the compressor 34 in accordance with the present invention, the degree of refrigeration may be controlled by a continuously operating compressor 34 in which the evaporator 32 refrigeration process is regulated by an electrical expansion valve 10. For example, the maximum amount of cooling or refrigeration is available when the electrical expansion valve 10 is fully open or has its maximum cross-sectional flow area. The least amount of cooling or refrigeration is available when the electrical expansion valve 10 is energized to reduce the effective cross-sectional flow area to some fraction of the maximum cross-sectional flow area. Because the thermal mass of the heating element 18 is small, the changes in the refrigeration or cooling output of the refrigeration system 30 may be more rapid than otherwise possible.

The heating element 18 modifies the throttling characteristics of the channel 12. Advantageously, the electrical expansion valve 10 has no moving parts that may become disfunctional because of material fatigue, corrosion, breakage, mechanical stress, thermal stress, or otherwise. The electrical expansion valve 10 of the invention is well-suited for controlling the refrigerant flow over a wide range of operating conditions in conjunction with a continuously operating compressor, an intermittently operating compressor, or a compressor controlled with respect to the temperature of a refrigerated space. The operating conditions may be based upon superheat of the fluid refrigerant which may be defined in terms of the pressure of the refrigerant coming into the evaporator 32 and the temperature of the refrigerant as it leaves the evaporator 32.

The foregoing description of the electrical expansion valve and refrigeration system describe several illustrative examples of the invention. Modifications, alternative arrangements, and variations of these illustrative examples are possible and may fall within the scope of the invention. According, the following claims should be accorded the reasonably broadest interpretation, which is consistent with the specifications disclosed herein and are not unduly limited by aspects of the preferred embodiments disclosed herein.

I claim:

1. An expansion valve for regulating the flow of a fluid, the expansion valve comprising:
    a channel for conveying the fluid, the channel having an inlet for accepting the fluid and an outlet for exhausting the fluid;
    a heating element disposed in a path of the fluid and associated with the inlet; and
    an electrical terminal coupled to the heating element for controlling the thermal properties of the heating element to regulate the flow of the fluid through the channel, wherein the thermal properties of the heating element interact with the fluid so as to directly change the flow properties of the fluid.

2. The expansion valve according to claim 1 wherein the channel comprises a generally tubular member.

3. The expansion valve according to claim 1 wherein the channel comprises a generally cylindrical member composed of brass.

4. The expansion valve according to claim 1 further comprising an inlet screen and an outlet screen, the inlet being encapsulated by the inlet screen and the outlet being encapsulated by the outlet screen.

5. The expansion valve according to claim 1 wherein the heating element comprises a resistive heating element.

6. The expansion valve according to claim 1 wherein the heating element comprises a wire-wound resistor.

7. The expansion valve according to claim 1 wherein the terminal comprises a conductor for applying a direct current voltage to the heating element.

8. The expansion valve according to claim 1 wherein the channel has a maximum flow area determined by a cross-sectional area of the inlet, and wherein the heating element is used to control the effective flow area of the channel within a range between the maximum flow area and approximately twenty percent of the maximum flow area.

9. The expansion valve according to claim 1 wherein the expansion valve further comprises a housing for mounting the channel and the heating element within a pipe of a refrigeration system.

10. A refrigeration system comprising:
    an evaporator for facilitating evaporation of a refrigerant fluid within a lower pressure region of the refrigeration system;
    a compressor coupled to an output of the evaporator for increasing the pressure of the refrigerant fluid from the lower pressure region;
    a condenser receiving the refrigerant fluid of increased pressure and condensing the refrigerant back into a liquid within a higher pressure region; and
    an expansion valve coupled to the output of the condenser for providing an interface between the higher pressure region and a lower pressure region, the expansion valve comprising a channel for conveying the refrigerant fluid from an inlet to an outlet, a heating element disposed in a path of the refrigerant fluid and associated with the inlet, the heating element controlling a degree of circulation of the fluid refrigerant by localized heating of the fluid refrigerant, wherein the localized heating interacts with the fluid so as to directly change the flow properties of the fluid.

11. The refrigeration system according to claim 10 wherein the channel comprises a generally tubular member.

12. The refrigeration system according to claim 10 wherein the channel comprises a generally cylindrical member composed of brass.

13. The refrigeration system according to claim 10 further comprising an inlet screen and an outlet screen, the inlet being encapsulated by the inlet screen and the outlet being encapsulated by the outlet screen.

14. The refrigeration system according to claim 10 wherein the heating element comprises a resistive heating element.

15. The refrigeration system according to claim 10 wherein the heating element comprises a wire-wound resistor.

16. The refrigeration system according to claim 10 wherein the terminals comprise wires for applying a direct current voltage to the heating element.

17. The refrigeration system according to claim 10 wherein the channel has a maximum flow area determined by a cross-sectional area of the inlet, and wherein the heating element is used to control the effective flow area of the channel within a range between the maximum flow area and approximately twenty percent of the maximum flow area.

18. The refrigeration system according to claim 10 wherein the refrigeration system further comprises a housing for mounting the channel and the heating element within a pipe of a refrigeration system.

19. The refrigeration system according to claim 10 wherein the refrigeration system comprises an air-conditioning system of a vehicle.

20. The expansion valve according to claim 1, wherein the change in the flow properties of the fluid is caused solely by the thermal properties of the heating element interacting with the fluid.

21. The expansion valve according to claim 1, wherein the change in the flow properties of the fluid is caused without interaction with a moving mechanical device.

22. The expansion valve according to claim 1, wherein the thermal properties of the heating element interacting with the fluid causes pockets of vapor or bubbles to form near the inlet that cause the change in the flow properties of the fluid.

23. The refrigeration system according to claim 10, wherein the change in the flow properties of the fluid is caused solely by the localized heating interacting with the fluid.

24. The refrigeration system according to claim 10, wherein the change in the flow properties of the fluid is caused without interaction with a moving mechanical device.

25. The refrigeration system according to claim 10, wherein the localized heating interacting with the fluid causes pockets of vapor or bubbles to form near the inlet that cause the change in the flow properties of the fluid.

26. An expansion valve system for regulating the flow of a fluid, the system comprising:
    a conduit with a fluid flowing within an interior of the conduit; and
    an expansion valve positioned within the interior of the conduit, the expansion valve comprising:

a channel for conveying the fluid, the channel having an inlet for accepting the fluid and an outlet for exhausting the fluid;

a heating element disposed in a path of the fluid and associated with the inlet; and an electrical terminal coupled to the heating element for controlling the thermal properties of the heating element to regulate the flow of the fluid through the channel, wherein the thermal properties of the heating element interact with the fluid so as to directly change the flow properties of the fluid.

27. The expansion valve system of claim 26, further comprising a housing that is positioned within the interior of the conduit and contacts the conduit, the housing having a recess into which the channel is received.

28. The expansion valve system according to claim 26, wherein the change in the flow properties of the fluid is caused solely by the thermal properties of the heating element interacting with the fluid.

29. The expansion valve system according to claim 26, wherein the change in the flow properties of the fluid is caused without interaction with a moving mechanical device.

30. The expansion valve system according to claim 26, wherein the thermal properties of the heating element interacting with the fluid causes pockets of vapor or bubbles to form near the inlet that cause the change in the flow properties of the fluid.

* * * * *